US010684025B2

(12) United States Patent
Qin et al.

(10) Patent No.: US 10,684,025 B2
(45) Date of Patent: Jun. 16, 2020

(54) METHOD OF CONTROLLING A FLUID CIRCULATION SYSTEM

(71) Applicants: TRANE INTERNATIONAL INC., Piscataway, NJ (US); TRANE AIR CONDITIONING SYSTEMS (CHINA) CO., LTD., Taicang, Jiangsu Province (CN)

(72) Inventors: Yunfei Qin, Shanghai (CN); Jianming Zhang, Shanghai (CN)

(73) Assignees: TRANE AIR CONDITIONING SYSTEMS (CHINA) CO., LTD., Taicang, Jiangsu Province (CN); TRANE INTERNATIONAL INC., Davidson, NC (US)

( * ) Notice: Subject to any disclaimer, the term of this patent is extended or adjusted under 35 U.S.C. 154(b) by 69 days.

(21) Appl. No.: 14/902,643

(22) PCT Filed: Jul. 1, 2013

(86) PCT No.: PCT/CN2013/078584
§ 371 (c)(1),
(2) Date: Jan. 4, 2016

(87) PCT Pub. No.: WO2015/000111
PCT Pub. Date: Jan. 8, 2015

(65) Prior Publication Data
US 2016/0169549 A1 Jun. 16, 2016

(51) Int. Cl.
*F24F 3/06* (2006.01)
*G05D 7/06* (2006.01)
(Continued)

(52) U.S. Cl.
CPC ............... *F24F 3/06* (2013.01); *F24F 11/83* (2018.01); *G05D 7/0676* (2013.01); *F24F 2140/12* (2018.01); *F24F 2140/20* (2018.01)

(58) Field of Classification Search
CPC ........ F24F 11/008; F24F 2140/12; F24F 3/06; F24F 11/83
See application file for complete search history.

(56) References Cited

U.S. PATENT DOCUMENTS 5,533,352 A * 7/1996 Bahel .................. F24F 11/0009
62/180
5,769,314 A * 6/1998 Drees ...................... F24F 3/044
165/217
(Continued)

FOREIGN PATENT DOCUMENTS

CN 1908836 2/2007
CN 102037293 4/2011
(Continued)

OTHER PUBLICATIONS

Description JP2004028476 machine translation (Year: 2004).*
International search report for international application No. PCT/CN2013/078584, dated Apr. 3, 2014 (5 pages).
(Continued)

*Primary Examiner* — Gordon A Jones
(74) *Attorney, Agent, or Firm* — Hamre, Schumann, Mueller & Larson, P.C.

(57) ABSTRACT

Methods as disclosed herein are generally configured to help determine a pressure differential (or pressure head) in a fluid circulation system of for example, a HVAC system, for controlling the fluid circulation system. The method may include obtaining a correlation between a fluid flow rate and a pressure differential in the fluid circulation system by varying an operation speed of the pump. The method may also include obtaining a desired fluid flow rate for matching a cooling capacity of the HVAC system and determining a pressure differential setpoint corresponding to the desired fluid flow rate based on the correlation between the fluid flow rate and the pressure differential. The methods can be
(Continued)

executed by, for example, a controller of the HVAC system so as to eliminate the requirement of a user to set up the pressure differential.

7 Claims, 5 Drawing Sheets

(51) Int. Cl.
*F24F 11/83* (2018.01)
*F24F 140/20* (2018.01)
*F24F 140/12* (2018.01)

(56) References Cited

U.S. PATENT DOCUMENTS

| | | | | |
|---|---|---|---|---|
| 6,381,970 B1* | 5/2002 | Eber | ................... | F24F 3/153 62/173 |
| 7,322,205 B2* | 1/2008 | Bourne | ................... | F24F 3/044 62/305 |
| 8,325,637 B2* | 12/2012 | Salsbury | ................ | H04W 24/00 370/252 |
| 9,534,795 B2* | 1/2017 | Burt | ................... | F24D 19/1015 |
| 2003/0064676 A1 | 4/2003 | Federspiel | | |
| 2006/0116067 A1 | 6/2006 | Federspiel | | |
| 2008/0264086 A1* | 10/2008 | Liu | ................... | F24F 11/83 62/180 |
| 2010/0057258 A1 | 3/2010 | Clanin | | |
| 2010/0147394 A1* | 6/2010 | Trnka | ................... | F24D 19/1015 137/12 |
| 2011/0213502 A1* | 9/2011 | Uden | ................... | F24F 11/0009 700/282 |
| 2014/0097367 A1* | 4/2014 | Burt | ................... | F24D 19/1015 251/129.04 |
| 2014/0360604 A1* | 12/2014 | Rosca | ................... | G01F 1/00 137/624.27 |
| 2015/0219093 A1* | 8/2015 | Lau | ................... | F04D 15/029 417/1 |

FOREIGN PATENT DOCUMENTS

| | | | |
|---|---|---|---|
| CN | 103076815 A | | 5/2013 |
| EP | 0721089 | | 7/1996 |
| JP | 2004028476 A | * | 1/2004 |
| NZ | 562702 | | 1/2009 |
| WO | 2007108871 | | 9/2007 |
| WO | WO-2008086489 A2 | * | 7/2008 ............ F24F 1/0059 |

OTHER PUBLICATIONS

Written Opinion for international application No. PCT/CN2013/078584, dated Apr. 3, 2014 (4 pages).
Chinese Office Action, Chinese Patent Application No. 201380078965.6, dated Apr. 4, 2018, with partial English translation (11 pages).

* cited by examiner

| Operation Frequency | Water Head | Flow Rate |
|---|---|---|
| 60 | | |
| 59 | | |
| 58 | | |
| 57 | | |
| 56 | 175 | 5.6 |
| 55 | 173 | 5.5 |
| 54 | 170 | 5.4 |
| 53 | 165 | 5.3 |
| ... | ... | ... |
| 31 | | |
| 30 | | |

Fig. 5

METHOD OF CONTROLLING A FLUID CIRCULATION SYSTEM

FIELD

The disclosure herein generally relates to a fluid circulation system. More specifically, the disclosure herein relates to a fluid (such as water) circulation system of, for example, a heating, ventilation, and air-conditioning ("HVAC") system. Generally, methods are described that are directed to help control the fluid circulation system.

BACKGROUND

A fluid circulation system is generally configured to circulate a fluid. For example, a fluid circulation system can be coupled to a HVAC system to help circulate a process fluid (such as water) between a terminal device (such as a room unit) and an outdoor unit, which may include an evaporator coil, of the HVAC system. The fluid circulation system may generally include one or more pumps to provide and/or regulate a fluid flow.

To control the fluid circulation, typically, a user can set up a fluid pressure differential setpoint between two pressure measuring points in the fluid circulation system so as to control a capacity (or flow rate) of the fluid circulation system. Generally, the higher the fluid pressure differential setpoint is, the higher the fluid flow rate provided by the fluid circulation system.

In some situations, the fluid circulation system may be configured to provide and/or maintain a certain fluid flow rate. For example, in the fluid circulation system that is configured to circulate the process fluid (such as water) through an outdoor unit of a HVAC system, it may be desirable to maintain a certain fluid flow rate to an evaporator coil of the outdoor unit. The fluid flow rate may depend on, for example, a cooling capacity of the HVAC system. Generally, the larger the cooling capacity is, the higher the desired fluid flow rate. A user may set a desired fluid pressure differential setpoint in the fluid circulation system so that the fluid circulation system may provide and/or maintain a relatively constant fluid flow rate that is desired for the cooling capacity provided by the HVAC system.

SUMMARY

Methods as disclosed herein are generally configured to help determine a pressure differential (or pressure head) setpoint in a fluid circulation system of, for example, a HVAC system, for controlling a fluid flow rate of the fluid circulation system. The method may also be applicable to other fluid circulation systems that may use a pressure differential to control the fluid flow rate in the fluid circulation systems.

In some embodiments, the method may include obtaining a correlation between a fluid flow rate and a pressure differential in the fluid circulation system. The method may include providing a variable fluid flow rate or a plurality of fluid flow rates, and obtaining the pressure differential and the fluid flow rate at each of the fluid flow rates. The correlation can be established by correlating the pressure differentials and the fluid flow rates at a plurality of fluid flow rates. In some embodiments, the plurality of fluid flow rates can be provided by varying an operation speed of a pump of the fluid circulation system. By varying the operation speed of the pump, the fluid circulation system can be configured to provide a plurality of fluid flow rates and pressure differentials. The fluid flow rate and the pressure differential at each of a plurality of pump operation speeds can be obtained by, for example, a fluid flow rate meter and a pressure measuring device respectively. A correlation can then be established between the fluid flow rates and the pressure differentials by plotting the measured fluid flow rate and the pressure differential at each pump operation speed.

In some embodiments, to obtain the pressure differentials and the fluid flow rates, the pump can be operated at each of the plurality of operation speeds for a period of time, such as for example about 30 seconds, to stabilize the fluid flow in the fluid circulation system.

In some embodiments, the method may include obtaining a desired fluid flow rate. In some embodiments, when the fluid circulation system is coupled to a HVAC system, the desired fluid flow rate may be determined based on a cooling capacity of the HVAC system. Generally, the higher the cooling capacity of the HVAC system is, the higher the desired fluid flow rate.

In some embodiments, the method may include determining a pressure differential setpoint based on the correlation between the fluid flow rates and the pressure differentials as well as the desired fluid flow rate. In some embodiments, the pressure differential setpoint is at least equal to the desired pressure differential that is determined based on the cooling capacity of the HVAC system.

In some embodiments, the pressure differential may be a pressure differential between a processing fluid inlet and a processing fluid outlet of an outdoor unit of the HVAC system that is coupled to the fluid circulation system.

In some embodiments, the method may include controlling the pump of the fluid circulation system to provide and/or maintain the pressure differential setpoint.

In some embodiments, the methods as disclosed herein can be executed by, for example, a controller of the HVAC system so as to eliminate the requirement of a user to determining the pressure differential setpoint.

In some embodiments, a device including a controller with a process can be configured to execute the methods as disclosed herein.

Other features and aspects of the embodiments will become apparent by consideration of the following detailed description and accompanying drawings.

BRIEF DESCRIPTION OF THE DRAWINGS

Reference is now made to the drawings in which like reference numbers represent corresponding parts throughout.

FIG. 5 illustrates an example of setting a pressure differential setpoint in a fluid circulation system.

DETAILED DESCRIPTION

Figure 1:
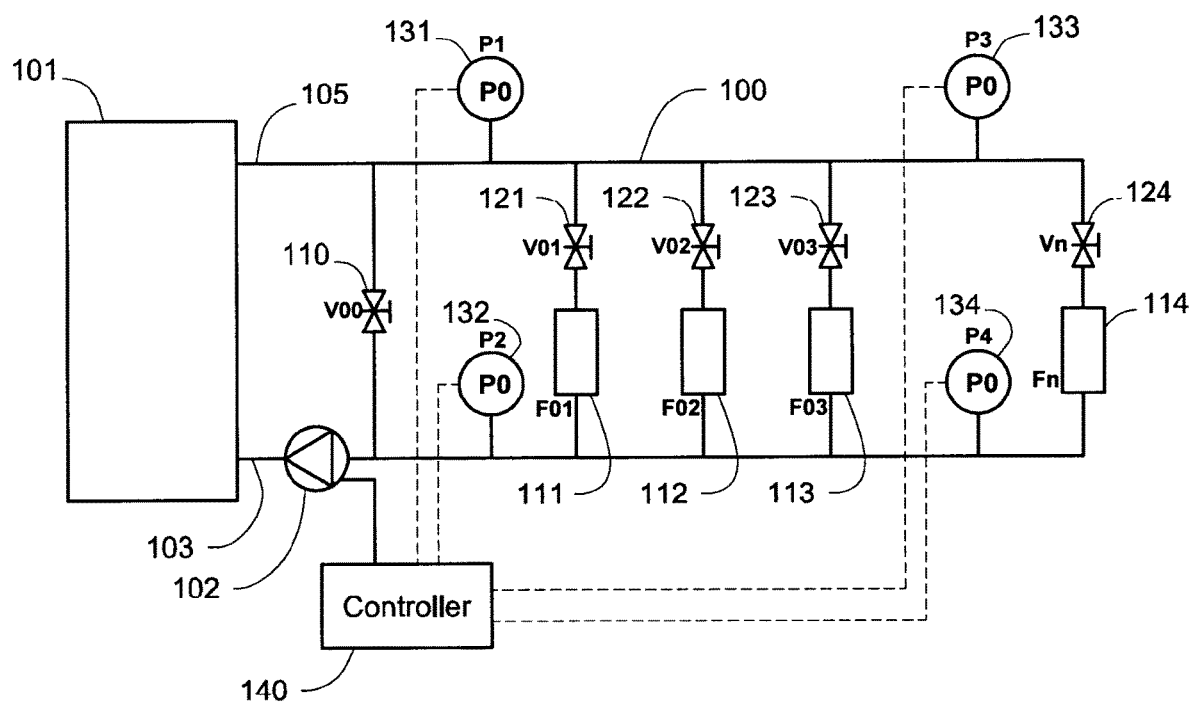
FIG. 1 illustrates a typical fluid circulation system that is coupled to a HVAC system, with which the embodiments as disclosed herein can be practiced.

A fluid circulation system often includes one or more fluid pumps to circulate a fluid in the fluid circulation system. The fluid circulation system can often be coupled to other systems, such as a HVAC system. FIG. 1 illustrates a typical fluid circulation system 100 that is configured to circulate a process fluid (such as water) through an outdoor unit 101 of a HVAC system, which is generally configured to house for example an evaporator coil. The fluid circulation system 100 can circulate a process fluid through the evaporator coil to help exchange heat between the process fluid and the evaporator coil. The fluid circulation system 100 can also help circulate the process fluid between the outdoor unit 101 and one or more terminal devices 111-114 (such as room units).

It is to be understood that similar fluid circulation systems can also be configured to work with other systems (e.g. a water heater, or a radiator).

In the illustrated embodiment, the fluid can be directed into the outdoor unit 101 through an inlet 103 and directed out of the outdoor unit 101 through an outlet 105. The fluid circulation system 100 includes a pump 102 and the plurality of terminal devices 111-114, with the understanding that the number of the terminal devices is exemplary and can be varied. The fluid circulation system 100 can also include a by-pass valve 110. In the illustrated embodiment, the fluid flowing into the terminal devices 111-114 can be regulated by a plurality of valves 121-124 respectively. The valves 121-124 as well as the by-pass valve 110 generally has an "open" state that is configured to allow a fluid flow through the valve and a "closed" state that is configured to generally prevent a fluid flow through the valve.

In operation, the fluid circulation system 100 can be configured to help direct the process fluid into the outdoor unit 101 so as to exchange heat with refrigerant in the evaporator coil of the outdoor unit 101. After heat exchange, the fluid can be directed out of the outdoor unit 101 and be distributed into the terminal devices 111-114 via the valves 121-124 respectively. The terminal devices 111-114 can be a room unit that is configured to help exchange heat between the process fluid and indoor air.

The HVAC system may have a designed cooling capacity. In operation, it is generally desired that a certain fluid flow rate through the outdoor unit 101 is maintained based on the cooling capacity so that the refrigerant can exchange heat with the process fluid efficiently. Generally, the higher the cooling capacity is, the higher the desired fluid flow rate through the outdoor unit 101.

The fluid flow rate in the fluid circulation system 101 may be provided and/or regulated by the pump 102. For example, in some embodiments, the operation speed of the pump 102 can be varied. Generally, the higher the operation speed is, the higher the fluid flow rate. In some embodiments, a plurality of pumps can be used as the pump 102.

The operation speed of the pump 102 can be controlled by, for example, a controller 140. The controller 140 may include a central process unit and a memory unit so that the controller 140 is capable of executing commands, controlling, for example, the pump 102, and/or communicating with other components (such as pressure measuring devices 131-134) of the fluid circulation system 100.

The fluid circulation system 100 may also include a plurality of pressure measuring devices 131-134 which can be pressure sensors, with the understanding that the number and locations of the pressure measuring devices 131-134 are exemplary and can be varied. The pressure measuring devices 131-134 can be configured to obtain fluid pressures at the corresponding positions of the pressure measuring devices 131-134 along the fluid circulation system 100. The pressure readings obtained by one of more of the pressure measuring devices 131-134 can be sent to the controller 140 to help control the operation of the fluid circulation system 100.

In some embodiments, pressure differentials among the pressure measuring devices 131-134 may be used to control the fluid circulation system 100. For example, the pressure measuring device 131 and the pressure measuring device 132 are generally configured to measure a first pressure of the fluid flowing out of the outlet 105 of the outdoor unit 101 and a second pressure of the fluid flowing toward the pump 102 respectively. The pressure differential between the first pressure and the second pressure (which can also be called pressure head for the outdoor unit 101) may correlate to a fluid flow rate through the fluid circulation system 100. Generally, the higher the pressure differential is, the higher the fluid flow rate. To control the pump 102 and the fluid flow rate in the fluid circulation system 100, in some embodiments, the controller 140 can be configured to change the operation speed of the pump 102 so that a pressure differential between the first pressure and the second pressure can be maintained at a setpoint. In some embodiments, the pressure differential setpoint between the first and second pressures can be configured so that when the pressure differential is maintained at the setpoint, the fluid flow rate through the outdoor unit 101 can be at a desired fluid flow rate, for example, matching the cooling capacity of the HVAC system.

It is to be understood that the fluid circulation system 100 can also be controlled by other parameters. For example, in another embodiment, the pressure differential between the pressure measuring device 133 and 134, which are generally configured to obtain fluid pressures of the fluid flowing into the last terminal device 114 and the fluid flowing out of the last terminal device 114 respectively, can be used to control the fluid flow rate in the fluid circulation system 100.

An issue with setting up the pressure differential setpoint is that the pressure differential setpoint typically has to be set at a work site by a user. For a given fluid flow rate through the fluid circulation system 100, the pressure differential measured by the pressure measuring devices 131-134 can be affected by various factors including a length of the fluid pipes in the fluid circulation system 100, a number of terminal devices 111-114, heights of the terminal devices 111-114, among other factors. When configuring the fluid circulation system 100, a user typically may have to determine the pressure differential setpoint based on the configuration of the fluid circulation system 100 at the work site, and may have to adjust the pressure differential setpoint based on his knowledge and/or experience at the work site. This process may be long and the accuracy may be poor. Improvements can be made to help set up the pressure differential to control the fluid circulation system 100.

Methods as disclosed herein are generally configured to help determine a pressure differential (or pressure head) in a fluid circulation system of, for example, a HVAC system, for controlling the fluid circulation system. In some embodiments, the method may include obtaining a correlation between a fluid flow rate and a pressure differential in the fluid circulation system. The correlation can be obtained by providing a variable fluid flow rate or a plurality of fluid flow rates via, for example, operating a pump at a plurality of operation speeds, and measuring the fluid flow rate and the pressure differential at each of the operation speeds. The method may also include obtaining a desired fluid flow rate to match a cooling capacity of the HVAC system and determining a pressure differential setpoint based on the correlation between the fluid flow rate and the pressure differential as well as the desired fluid flow rate. In some embodiments, the methods as disclosed herein can be executed by, for example, a controller of the HVAC system and the pressure differential setpoint can be set up automatically, so as to eliminate the requirement of a user to determine the pressure differential setpoint.

References are made to the accompanying drawings that form a part hereof, and in which is shown by way of illustration of the embodiments in which the embodiments may be practiced. It is to be understood that the terms used herein are for the purpose of describing the figures and embodiments and should not be regarded as limiting the scope of the present application.

Figure 2:
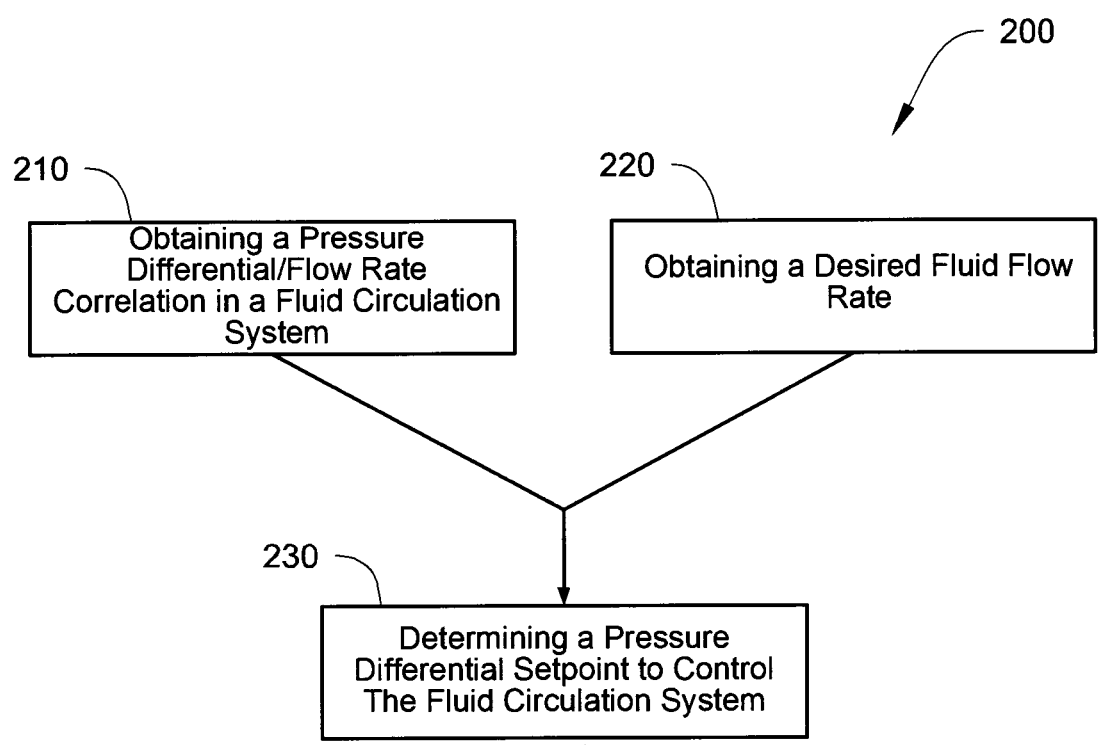
FIG. 2 illustrates a method of determining a pressure differential setpoint in a fluid circulation system and controlling the fluid circulation system.

FIG. 2 illustrates a method 200 to obtain a desired pressure differential setpoint in a fluid circulation system. The method 200 can be implanted in a fluid circulation system that is configured similarly to the fluid circulation system 100 as illustrated in FIG. 1. The fluid circulation may be configured to provide a process fluid to an outdoor unit (such as the outdoor unit 101 as shown in FIG. 1) of a HVAC system. The method 200 can be executed, for example, by the controller 140 as illustrated in FIG. 1. It is to be understood that the method as illustrated herein can generally be used with other fluid circulation system that uses a pressure differential to control a fluid flow rate.

Referring back to the fluid circulation system 100 as shown in FIG. 1, at 210, the method 200 includes establishing a correlation between a pressure differential and a fluid flow rate in the fluid circulation system 100. The pressure differential referred here can be, for example, the pressure differential between the first pressure (e.g. the fluid pressure at the outlet 105 of the outdoor unit 101) measured by the pressure measuring device 131 and the second pressure (e.g. the fluid pressure of the fluid flowing into the pump 102) measured by the pressure measuring device 132. This pressure differential can sometime be referred to as a pressure head.

Generally at 210, all of the valves, the valves 121, 122, 123 and 123, are open so as to generally allow a fluid flow through the valves 121-124. The by-pass valve 110 may be closed so as to generally block a fluid flow.

To establish the correlation between the pressure differential and the fluid flow rate in the fluid circulation system 100, the fluid circulation system 100 may be configured to provide a plurality of fluid flow rates, and the pressure differentials can be measured at each of the plurality of fluid flow rates. In some embodiments, to provide the plurality of fluid flow rates, the controller 140 may be configured to change an operation speed of the pump 102, with each operation speed providing a different fluid flow rate. At each of the operation speed, that the pressure differential and the fluid flow rate can be obtained. For example, a typical fluid pump can be operated between about 25 Hz to about 60 Hz. The controller 140 can be configured to regulate the operation speed of the pump 102 between about 25 Hz and about 60 Hz in one Hz incremental. At each operation speed, the pump 102 can be operated for a period of time (such as 30 seconds) so that the fluid flow in the fluid circulation system 100 may be generally stabilized at the operation speed of the pump 102. And the fluid flow rate at each operation speed can be measured, for example, by a fluid flow rate meter.

At each operation speed, the controller 140 can obtain the fluid flow rate and the pressure differential. The fluid flow rate can be obtained, for example, by a fluid flow rate meter (not shown), at the inlet 103 and/or the outlet 105 of the fluid circulation system 100 as well as other locations along the fluid circulation system 100. It is appreciated that the fluid flow rate may also be obtained by other suitable methods, such as calculated based on pressure differentials. The pressure differential can be obtained, for example, by calculating a pressure differential between the first pressure measured by the pressure measuring device 131 and the second pressure measured by the pressure measuring device 132. This process can also be executed by the controller 140.

Generally, each fluid flow rate corresponds to a specific pressure differential in the fluid circulation system 100. Generally, the higher the operation speed of the pump 102 is, the higher the fluid flow rate and the higher the pressure differential. By operating the pump 102 at a plurality of operation speeds, a plurality of corresponding flow rates and pressure differentials can be obtained. Thus, a correlation diagram between the fluid flow rates and the pressure differentials can be obtained.

Figure 3:
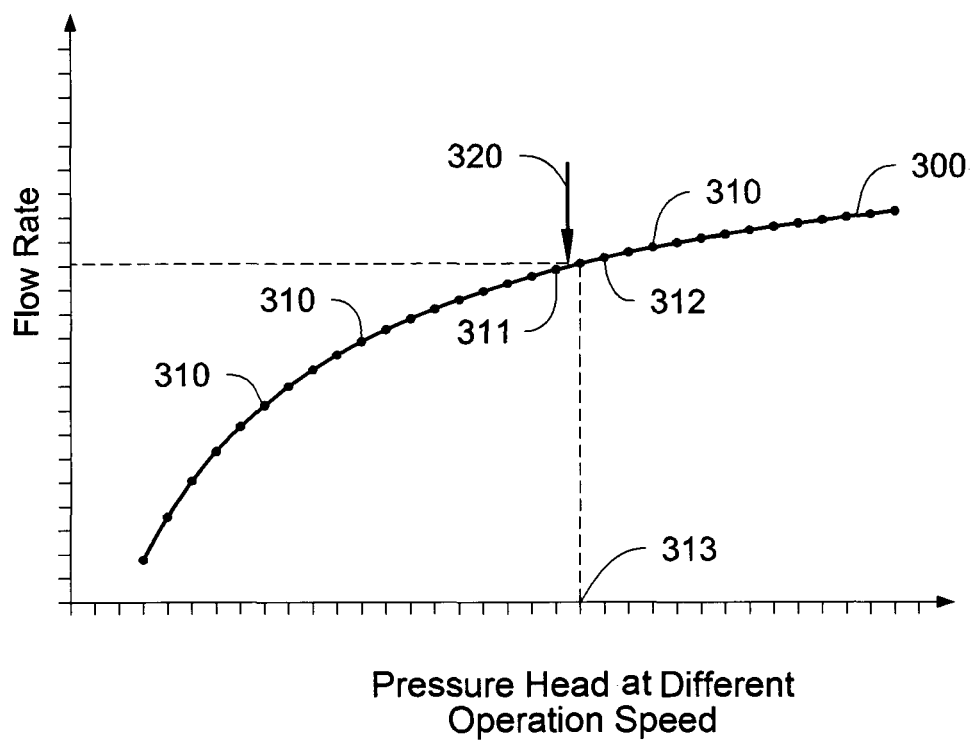
FIG. 3 illustrates an exemplary correlation between a pressure differential and a fluid flow rate in a fluid circulation system.

FIG. 3 shows an illustrative diagram 300 of the correlation between the fluid flow rate and the pressure differential. In FIG. 3, each point 310 along the diagram 300 represents a specific fluid flow rate and its corresponding pressure differential measured at a specific operation speed. The correlation between the fluid flow rate and the pressure differential (i.e. the diagram 300) may be different when, for example, the configuration of the fluid circulation system 100 changes. However, for a particular configuration of the flow circulation system, a specific correlation between the fluid flow rate and the pressure differential can be established based on the method disclosed herein.

At 220, a desired fluid flow rate can be obtained. In a HVAC system, the desired fluid flow rate may be determined based on a cooling capacity of the HVAC system. For example, the desired fluid flow rate can be calculated based on the equation: $Q0=K*A*(m^3/h*kW)*C$ (kW). Q0 is the desired fluid flow rate. A is a constant and generally is set at 0.1584. C is the cooling capacity of the HVAC system. K is a correction coefficient, which may be varied based on, for example, the system design. The default number for K is 1.0. The cooling capacity of the HVAC system may be provided by the manufacturer of the HVAC system. The controller 140, for example, can calculated the desired fluid flow rate Q0 based on the equation $Q0=K*0.1584(m^3/h*kW)*C$ (kW). It is to be appreciated that the desired fluid flow rate can be obtained based on other parameters or criteria. The desired fluid flow rate can also be determined by a user.

At 230, a pressure differential setpoint can be determined based on the desired fluid flow rate obtained at 220 and the correlation between the pressure differential and the fluid flow rate obtained at 210. Referring to FIG. 3, arrow 320 indicates a point along the graph 300 that corresponds to an exemplary desired fluid flow rate. The exemplary desired fluid flow rate is higher than the fluid flow rate corresponding to the point 311 but lower than the fluid flow rate corresponding to the point 312. At 230, the method 300 can include choosing the point among the points 310 that corresponds to a fluid flow rate that is at least equal to the exemplary desired fluid flow rate (that is the point 310 having a fluid flow rate is at least Q0). Accordingly, the method 200 can include choosing the point 312. The method 200 can include determining the pressure differential setpoint corresponding to the point (i.e. the point 312) that has a fluid flow rate at least equal to the desired fluid flow rate obtained at 220, based on the correlation between the pressure differential and the fluid flow rate obtained at 210.

It is to be understood that the pressure differential setpoint can also be determined so that the fluid circulation system can be configured to provide other fluid flow rates. Generally, a user can input a target fluid flow rate to the controller 140, and the controller can determine the pressure differential setpoint that enable the fluid circulation system 100 to provide the target fluid flow rate based on the correlation between the pressure differential and the fluid flow rate. It is also possible to change the pressure differential setpoint during a normal operation of the fluid circulation system.

During a normal operation, the valves 121-124 may be open or closed based on, for example, a cooling capacity demand of the corresponding terminal devices 111-114. The controller 140 can be configured to control, for example, the operation speed of the pump 102 so that the pressure differential measured by, for example, the pressure measuring devices 131 and 132, in the liquid circulation system 100 can be provided and/or maintained at the pressure differential setpoint. The controller 140 can increase the operation speed of the pump 102 if the pressure differential in the liquid circulation system 100 is lower than the pressure differential setpoint, or decrease the operation speed of the pump 102 if the pressure differential in the liquid circulation system 100 is higher than the pressure differential setpoint.

It is to be appreciated that the method 200 can be executed by, for example, the controller 140 automatically without much involvement of a user. For example, after the fluid circulation system of a HVAC system is set up in a work site, the controller 140 can execute the method 200 to establish a correlation between the pressure differential and the fluid flow rate that is specific for the fluid circulation system established at the work site. The controller 140 can then automatically set the pressure differential setpoint based on the cooling capacity, and then use the pressure differential setpoint to control a pump of the fluid circulation system. It generally does not require the user to set the pressure differential setpoint based on his knowledge about the fluid circulation system or experience on setting the pressure differential setpoint. The method 200 also generally does not require any knowledge of the actual configuration of the liquid circulation system at the work site. This can help simplify the procedure and increase accuracy of setting up the pressure differential setpoint.

It is to be appreciated that the fluid flow rate can be measured by, for example, a fluid flow rate meter. However, a fluid flow rate meter is only needed when the correlation between the pressure differential and the fluid flow rate is established initially at the work site. The fluid flow rate meter is not needed and therefore can be removed during a normal operation.

It is also to be appreciated that the variable speed pump 102 as illustrated in FIG. 1 is exemplary. The method 200 as illustrated in FIG. 2 can also be adapted to work with other types of pumps and/or methods of controlling the pump. Generally speaking, the method 200 can work with a fluid circulation system that is capable of providing a variable fluid flow rate or a plurality of fluid flow rates. As illustrated in FIG. 1, a plurality of fluid flow rates can be provided by varying an operation speed of a pump (e.g. the pump 102 in the fluid circulation system 100.)

Figure 4:
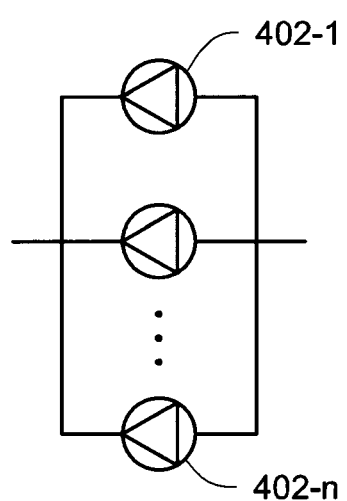
FIG. 4 illustrates a plurality of pumps arranged in parallel, which can be used in a fluid circulation system.

In some embodiments, a fluid circulation system may include a plurality of pumps, each of which may have, for example, a constant operation speed. The fluid circulation system may provide a plurality of fluid flow rates in the fluid circulation system by operating different number and/or combination of pumps. As illustrated in FIG. 4, a fluid circulation system may include a plurality of pumps 402-1 to 402-$n$ (where n is any integer larger than 1) arranged in parallel. The plurality of pumps 402-1 to 402-$n$ may replace the pump 102 in the fluid circulation system 100 as illustrated in FIG. 1. Each of the pumps 402-1 to 402-$n$ may be a constant speed pump, with the understanding that any of the pumps 402-1 to 402-$n$ may be a variable speed pump in some other embodiments. Each of the pumps 402-1 to 402-$n$ may have an "on" state and an "off" state. The fluid flow rate can be regulated by turning on each of the pumps 402-1 to 402-$n$ to the "on" or the "off" state.

The method 200 as illustrated in FIG. 2 can work with the plurality of pumps 402-1 to 402-$n$. To establish a correlation between the pressure differential and the fluid flow rate, instead of changing the operation speed of the pump, different number and/or combination of the pumps 402-1 to 402-$n$ can be used to provide a plurality of fluid flow rates and corresponding pressure differentials can be obtained. A correlation graph similar to what is illustrated in FIG. 3 can also be established. The pressure differential setpoint can then be established based on the desired fluid flow.

It is to be understood that the embodiments as disclosed herein can generally work with a fluid circulation system that is capable of providing a plurality of fluid flow rates. A correlation graph similar to what illustrated in FIG. 3 can be established by correlating the measured pressure differentials with the fluid flow rates.

EXAMPLE

FIG. 5 illustrates a portion of a correlation between the water head (kpa) and the fluid flow rate ($m^3$/h) when the operation frequency (i.e. the operation speed) of a pump varies. The measurement is conducted in a fluid circulation system of a HVAC system that is configured similarly to the embodiment as illustrated in FIG. 1. Water is used in the fluid circulation system. The fluid flow rate is measured by a fluid flow rate meter (not shown) and the water pressure head is obtained by calculating the pressure differential between the first pressure measured by one pressure measuring device (e.g. the pressure measuring device 131) and the second pressure measured by another pressure measuring device (e.g. the pressure measuring device 132) in the fluid circulation system.

All the valves that are configured to control fluid flow into a terminal device are open (e.g. the valves 121-124) when establishing a correlation between the water pressure head and the fluid flow rate. The operation frequency of the pump varies between 30 Hz and 60 Hz. The pump operates about 30 s at each operation frequency. The water pressure head (e.g. the pressure differential measured by the pressure measuring devices 131 and 132) and the corresponding water flow rate are recorded automatically by a controller (e.g. the controller 140 in FIG. 1). FIG. 4 illustrates results when the operation frequency is between 53 Hz and 56 Hz.

The cooling capacity of the HVAC system is 35 KW, which is given by the manufacture of the HVAC system. Based on the equation Q0=K*0.1584($m^3$/h*kW)*C (kW) and K is at its default value 1.0, it is calculated that the desired fluid flow rate is 5.4 $m^3$/h. The calculation can be executed by the controller (e.g. the controller 140) automatically. Based on the desired fluid flow rate 5.4 $m^3$/h, the controller can set the controlling water pressure head at 170 kpa.

Any aspects 1-6 can be combined with aspect 7.
Aspect 1. A method of determining a pressure differential setpoint to control a fluid circulation system, comprising:
providing a plurality of fluid flow rates;
measuring a pressure differential at each of the plurality of the fluid flow rates;
correlating the pressure differential and the fluid flow rate for each of the plurality of fluid flow rates;

obtaining a desired fluid flow rate in in the fluid circulation system; and determining a pressure differential setpoint based on the correlation between the pressure differential and the flow read in the fluid circulation system.

Aspect 2. The method of aspect 1, providing a plurality of fluid flow rates includes operating a pump of the fluid circulation system at a plurality of operation speeds.

Aspect 3. The method of aspects 1-2, wherein the desired fluid flow rate is determined based on a cooling capacity of a HVAC system that is coupled to the fluid circulation system.

Aspect 4. The method of aspects 1-3, wherein the pressure differential setpoint is at least equal to the pressure differential that correlates to the fluid flow rate that is at least equal to the desired fluid flow rate.

Aspect 5. The method of aspects 1-5, further comprising:

controlling a pump of the fluid circulation system to provide the pressure differential setpoint.

Aspect 6. The method of aspects 2-5, wherein providing a plurality of fluid flow rates includes operating the pump of the fluid circulation system at each of the plurality of operation frequencies for a predetermined period of time.

Aspect 7. A device of a fluid circulation system, comprising:

a controller with a processor to execute the method of claim 1.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

What claimed is:

1. A method of determining a pressure differential setpoint to control a fluid circulation system, comprising:

operating the fluid circulation system at each of a plurality of test fluid flow rates for circulation of a process fluid within the fluid circulation system, the fluid circulation system including one or more terminal devices each including a heat exchanger where the process fluid exchanges heat with indoor air via at least one of the heat exchangers;

measuring a pressure differential of the process fluid between at least two locations within the fluid circulation system for said each of the plurality of test fluid flow rates, wherein at least one of the at least two locations is upstream of at least one of the one or more terminal devices with respect to a flow of the process fluid in the fluid circulation system, and at least another one of the at least two locations is downstream of the at least one of the one or more terminal devices with respect to the flow of the process fluid in the fluid circulation system;

determining a correlation between pressure differential and fluid flow rate of the process fluid for the fluid circulation system based on the measured pressure differentials at the plurality of test fluid flow rates;

obtaining a desired fluid flow rate in the fluid circulation system; and determining a pressure differential setpoint for operation of the fluid circulation system at the desired fluid flow rate based on the correlation between pressure differential and fluid flow rate of the process fluid for the fluid circulation system, wherein providing the plurality of test fluid flow rates includes operating a pump of the fluid circulation system at a plurality of operation speeds, and measuring the pressure differential of the process fluid is performed when operating the pump of the fluid circulation system at the plurality of operation speeds.

2. The method of claim 1, wherein the desired fluid flow rate is determined based on a cooling capacity of a heating, ventilation, and air conditioning (HVAC) system that is coupled to the fluid circulation system.

3. The method of claim 1, wherein the pressure differential setpoint is equal to or greater than a pressure differential that is correlated with a fluid flow rate that is equal to or greater than the desired fluid flow rate.

4. The method of claim 1, further comprising:

controlling a pump of the fluid circulation system to provide the pressure differential setpoint.

5. The method of claim 1, wherein the providing the plurality of test fluid flow rates includes operating the pump of the fluid circulation system at each of a plurality of operation frequencies for a predetermined period of time.

6. A fluid circulation system, comprising:

one or more terminal devices each including a heat exchanger where a process fluid exchanges heat with indoor air;

an evaporator coil where the process fluid exchanges heat with a refrigerant;

a plurality of pressure measuring devices, configured to measure a pressure differential of the process fluid between at least two locations within the fluid circulation system, wherein at least one of the at least two locations is upstream of at least one of the one or more terminal devices with respect to a flow of the process fluid in the fluid circulation system, and at least another one of the at least two locations is downstream of the at least one of the one or more terminal devices with respect to a flow of the process fluid in the fluid circulation system;

a variable-speed pump; and a controller with a processor configured to:

direct operation of the fluid circulation system at each of a plurality of test fluid flow rates by varying an operating speed of the variable-speed pump;

determine the correlation between the pressure differential and the fluid flow rate of the process fluid based on the measured pressure differentials at the plurality of test fluid flow rates;

obtain a desired fluid flow rate in the fluid circulation system; and determine the pressure differential setpoint for operation of the fluid circulation system at the desired fluid flow rate based on the correlation between pressure differential and fluid flow rate of the process fluid, wherein the plurality of pressure measuring devices are configured to measure the pressure differential of the process fluid when operating the pump of the fluid circulation system at the plurality of operation speeds.

7. The method of claim 1, wherein the process fluid includes water.

* * * * *